US012220719B2

(12) United States Patent
Säll et al.

(10) Patent No.: US 12,220,719 B2
(45) Date of Patent: Feb. 11, 2025

(54) SPRAY NOZZLE CHIP

(71) Applicant: SHL MEDICAL AG, Zug (CH)

(72) Inventors: Daniel Säll, Segeltorp (SE); Rasmus Renstad, Stockholm (SE)

(73) Assignee: SHL Medical AG, Zug (CH)

( * ) Notice: Subject to any disclaimer, the term of this patent is extended or adjusted under 35 U.S.C. 154(b) by 412 days.

(21) Appl. No.: 17/772,447

(22) PCT Filed: Oct. 6, 2020

(86) PCT No.: PCT/EP2020/077990

§ 371 (c)(1),
(2) Date: Apr. 27, 2022

(87) PCT Pub. No.: WO2021/089263

PCT Pub. Date: May 14, 2021

(65) Prior Publication Data

US 2022/0395849 A1 Dec. 15, 2022

(30) Foreign Application Priority Data

Nov. 6, 2019 (EP) .................................... 19207343

(51) Int. Cl.
*B05B 12/00* (2018.01)
*B05B 1/14* (2006.01)
(Continued)

(52) U.S. Cl.
CPC .............. *B05B 12/008* (2013.01); *B05B 1/14* (2013.01); *B05B 15/40* (2018.02); *B65D 83/28* (2013.01)

(58) Field of Classification Search
CPC ......... B05B 12/008; B05B 1/14; B05B 15/40; B65D 83/28; B65D 83/14; G01L 9/0092;
(Continued)

(56) References Cited

U.S. PATENT DOCUMENTS 8,056,556 B2 11/2011 Childers et al.
2003/0178507 A1 9/2003 Maria Rijn Van et al.
(Continued)

FOREIGN PATENT DOCUMENTS

CA 3057403 A1 9/2018
CN 206828092 U 1/2018
(Continued)

OTHER PUBLICATIONS

International Search Report and Written Opinion for Int. App. No. PCT/EP2020/077990, mailed Jan. 15, 2021.

*Primary Examiner* — Qingzhang Zhou
*Assistant Examiner* — Joel Zhou
(74) *Attorney, Agent, or Firm* — McDonnell Boehnen & Berghoff LLP

(57) ABSTRACT

A spray nozzle chip is presented having a substrate with a spray side and a sieve side, a spray membrane provided on the spray side, a sieve membrane provided on the sieve side, wherein the spray membrane is provided with spray orifices and the sieve membrane is provided with sieve orifices, wherein the substrate has a fluid channel which connects the spray orifices with the sieve orifices, and a pressure sensing device configured to measure deformation of the spray membrane to obtain a measure of pressure on the spray membrane.

18 Claims, 6 Drawing Sheets

(51) Int. Cl.
*B05B 15/40* (2018.01)
*B65D 83/28* (2006.01)

(58) Field of Classification Search
CPC .... G01L 9/06; G01L 9/12; G01L 1/20; A61M 15/0021; A61M 11/02
See application file for complete search history.

(56) References Cited

U.S. PATENT DOCUMENTS

| | | | | |
|---|---|---|---|---|
| 2012/0012105 | A1 | 1/2012 | Heskamp et al. | |
| 2017/0156927 | A1 | 6/2017 | Richter et al. | |
| 2018/0172532 | A1 | 6/2018 | Huang | |
| 2020/0171703 | A1* | 6/2020 | Gelbart | B22F 12/90 |

FOREIGN PATENT DOCUMENTS

| | | | |
|---|---|---|---|
| JP | 2010-088979 | A | 4/2010 |
| JP | 2019-174478 | A | 10/2019 |
| JP | 2020-511282 | A | 4/2020 |
| TW | 201927415 | A | 7/2019 |
| WO | 2015/194962 | A1 | 12/2015 |
| WO | 2018/172561 | A1 | 9/2018 |
| WO | 2018/219798 | A1 | 12/2018 |

* cited by examiner

SPRAY NOZZLE CHIP

CROSS REFERENCE TO RELATED APPLICATIONS

The present application is a U.S. National Phase Application pursuant to 35 U.S.C. § 371 of International Application No. PCT/EP2020/077990 filed Oct. 6, 2020, which claims priority to European Patent Application No. 19207343.5 filed Nov. 6, 2019. The entire disclosure contents of these applications are herewith incorporated by reference into the present application.

TECHNICAL FIELD

The present disclosure generally relates to spray nozzle chips, for example for medicament delivery devices.

BACKGROUND

A nozzle device may be configured to atomise a liquid, i.e. to make an aerosol of the liquid. A nozzle device of this type may comprise a substrate having a sieve or filter side provided with a filter for filtering out any undesired larger particles contained in the liquid to be atomised. The substrate may also have a spray-side provided with a spray-membrane having a plurality of orifices. The spray-membrane and the filter are configured to be in liquid communication. In the process of atomisation, the liquid first passes the filter where a slight pressure drop is obtained. The filtered liquid subsequently passes through the orifices of the membrane, whereby the liquid is atomised.

An example of such a nozzle device is disclosed in WO2018/219798 A1. The nozzle device comprises: a substrate, a sieve-side membrane comprising a plurality of sieve-side orifices, the sieve-side membrane being provided on a sieve-side of the substrate, a spray-side membrane comprising a plurality of spray-side orifices, the spray-side membrane being provided on a spray-side of the substrate, wherein the substrate has a first cavity portion extending to the sieve-side membrane, and a second cavity portion extending from the first cavity portion to the spray-side membrane, thereby providing fluid communication, along a fluid communication axis, between the sieve-side orifices and the spray-side orifices, the first cavity portion having a larger cross-sectional area than a cross-sectional area of the second cavity portion, the cross-sections being with respect to the fluid communication axis.

SUMMARY

For some diseases such as respiratory diseases, e.g. asthma, it has been found that increased adherence to prescribed treatments and improved administration techniques will help control symptoms and reduce the risk of complications.

An object of the present disclosure is to provide a spray nozzle chip which solves or at least mitigates problems of the prior art.

There is hence according to a first aspect of the present disclosure provided a spray nozzle chip comprising: a substrate having a spray side and a sieve side, a spray membrane provided on the spray side, a sieve membrane provided on the sieve side, wherein the spray membrane is provided with spray orifices and the sieve membrane is provided with sieve orifices, wherein the substrate has a fluid channel which connects the spray orifices with the sieve orifices, and a pressure sensing device configured to measure deformation of the spray membrane to obtain a measure of pressure on the spray membrane.

It can thereby be detected whether an aerosol dispensing has been performed. In the event that the spray nozzle chip is mounted in an inhaler, the performance of the user may be monitored.

According to one embodiment the spray orifices are provided in a spray orifice region of the spray membrane, and wherein the pressure sensing device is configured to detect deformation of the spray orifice region. Pressure changes in the spray orifice region may thereby be detected.

According to one embodiment the pressure sensing device comprises one of a strain gauge sensor, a capacitive pressure sensor and a piezoresistive pressure sensor.

According to one embodiment the pressure sensing device is a microelectromechanical system (MEMS) pressure sensor.

According to one embodiment the pressure sensing device is arranged on the spray membrane.

One embodiment comprises a reference pressure sensing device, wherein the substrate has a closed cavity which is delimited by a reference pressure region of the spray membrane, wherein the reference pressure sensing device is configured to measure deformation of the reference pressure region. In case the reference pressure sensing device is installed in an inhaler, as the user inhales, the reference pressure region will be is deflected towards the user's mouth. The reference pressure sensing device may thereby facilitate monitoring of the inhalation technique of a user.

According to one embodiment the cavity is a vacuum cavity.

According to one embodiment the reference pressure sensing device comprises one of a strain gauge sensor, a capacitive pressure sensor and a piezoresistive pressure sensor.

According to one embodiment the reference pressure sensing device is a MEMS pressure sensor.

According to one embodiment the reference pressure sensing device is arranged on the spray membrane.

There is according to a second aspect of the present disclosure provided a spray nozzle device comprising: the spray nozzle chip according to the first aspect, and a contact interface configured to be electrically connected to the pressure sensing device to supply power to and obtain pressure measurement signals from the pressure sensing device.

One embodiment comprises the spray nozzle chip including the reference pressure sensing device, wherein the contact interface is configured to be electrically connected to the reference pressure sensing device to supply power to and obtain pressure measurement signals from the reference pressure sensing device.

There is according to a third aspect of the present disclosure provided an aerosol dispenser comprising the spray nozzle device according to the second aspect.

According to one embodiment the aerosol dispenser is a medicament delivery device.

According to one embodiment the medicament delivery device is an inhaler or eye dispenser.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
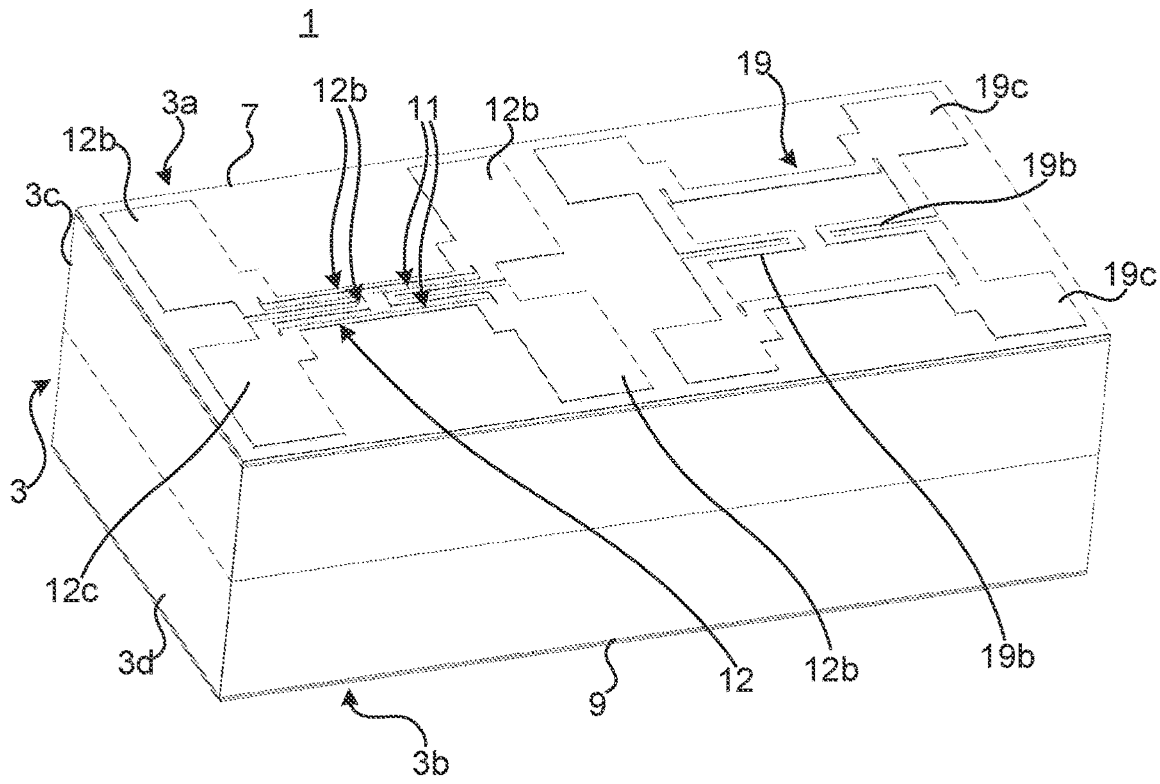
FIG. 1 is a perspective view of an example of a spray nozzle chip depicting a spray side thereof.

FIG. 1 shows an example of a spray nozzle chip 1. The spray nozzle 1 may be configured to be used in an aerosol dispenser. The spray nozzle 1 may be configured to be arranged in an aerosol dispenser.

The spray nozzle chip 1 comprises a substrate 3. The substrate 3 has a spray side 3*a* and a sieve side 3*b*. The spray side 3*a* and the sieve side 3*b* are arranged opposite to each other.

The substrate 3 may for example comprise a ceramic material such as silicon. The exemplified substrate 3 comprises a spray side substrate 3*c* and a sieve side substrate 3*d* which are joined or bonded, and which form the substrate 3. Alternatively, the substrate 3 could be made of a single piece of substrate material.

The spray nozzle chip 1 comprises a spray membrane 7. The spray membrane 7 may for example comprise silicon or a nitride. The spray membrane 7 is provided on the spray side 3*a* of the substrate 3. The spray membrane 7 may be bonded with the substrate 3; or formed by etching through the substrate 3 directly. The spray membrane 7 comprises a plurality of spray orifices 11. The spray membrane 7 has a spray orifice region comprising the spray orifices 11.

Figure 2:
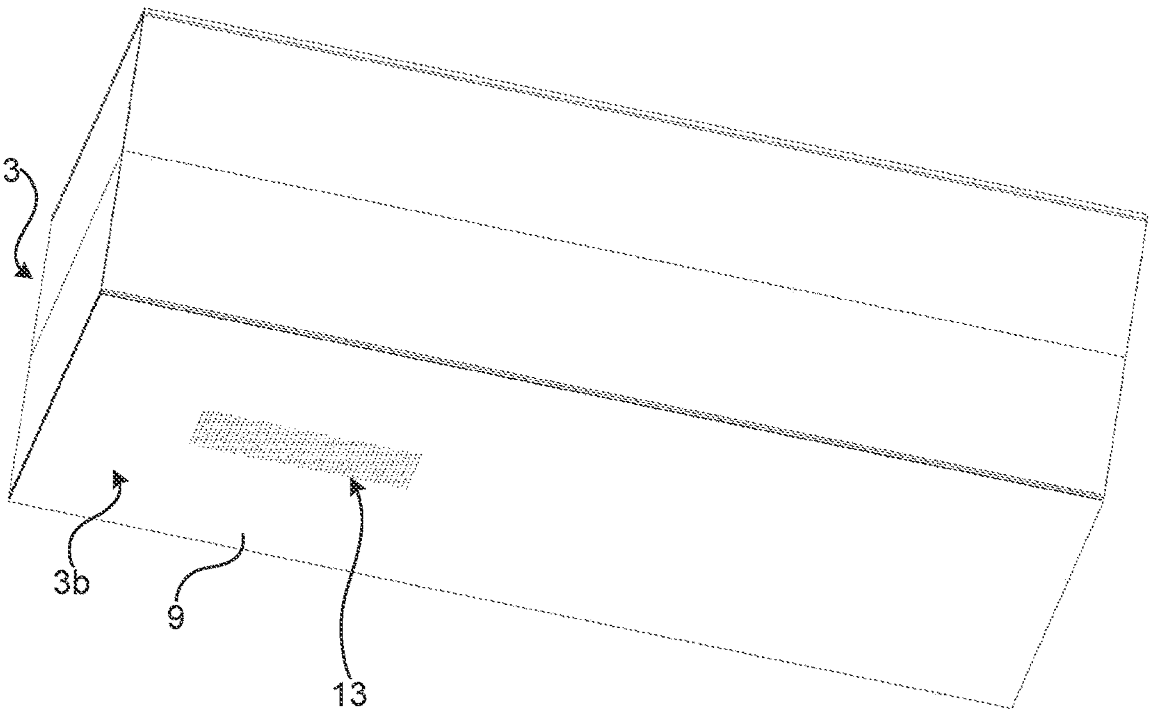
FIG. 2 is a perspective view of the spray nozzle chip in FIG. 1 showing a sieve side thereof.

The spray nozzle chip 1 comprises a sieve membrane 9. The sieve membrane 9 may for example comprise silicon or a nitride. The sieve membrane 9 is provided on the sieve side 3*b* of the substrate 3. The sieve membrane 9 is bonded with the substrate 3, or formed by etching through the substrate 3 directly. The sieve membrane 9 comprises a plurality of sieve orifices 13, shown in FIG. 2.

Figure 3:
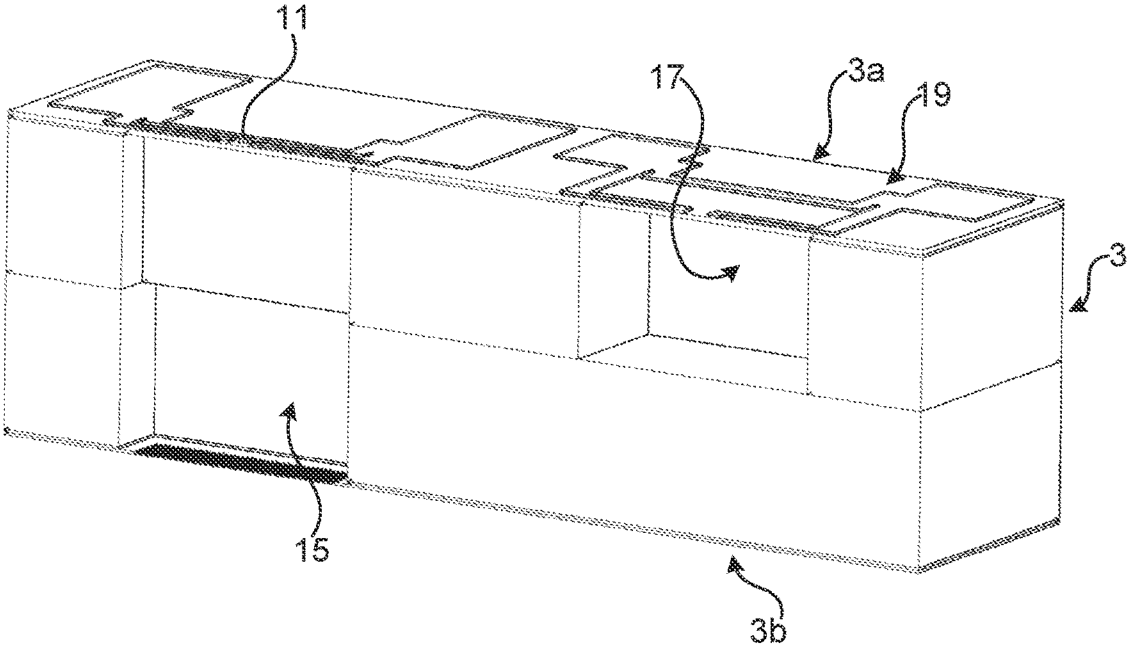
FIG. 3 shows a longitudinal cross section of the spray nozzle chip.

FIG. 3 shows a section of the spray nozzle chip 1. The substrate 3 has a fluid channel 15, which extends through the substrate 3 from the spray side 3*a* to the sieve side 3*b*. The fluid channel 15 connects the spray orifices 11 with the sieve orifices 13. The fluid channel 15 is configured to set the spray orifices 11 in fluid communication with the sieve orifices 13.

The spray orifice region is defined by the borders or boundary formed by the inner walls of the fluid channel 15 relative to the spray membrane 7.

Turning back to FIG. 1, the spray nozzle chip 1 comprises a pressure sensing device 12. The pressure sensing device 12 is configured to detect deformation of the spray membrane 7. The amount of deformation of the spray membrane 7 provides a measure of the pressure that the spray membrane 7 is subjected to. The pressure sensing device 12 is arranged on the spray membrane 7.

The pressure sensing device 12 is configured to detect deformation of the spray orifice region of the spray membrane 7. The pressure sensing device 12 or a portion thereof is arranged on the spray orifice region of the spray membrane 7.

The pressure sensing device 12 may be a MEMS pressure sensor.

In the example shown in FIG. 1, the pressure sensing device 12 is a strain gauge. The pressure sensing device 12 comprises a Wheatstone bridge. The pressure sensing device 12 comprises resistive elements 12*b* which form the Wheatstone bridge. The resistive elements 12*b* are provided on the spray orifice region of the spray membrane 7. The resistive elements 12*b* may for example extend adjacent to and parallel with the spray orifices 11. The pressure sensing device 12 may comprise contact pads 12*c* in electrical contact with the resistive elements 12*b*. The contact pads 12*c* may be configured to be electrically connected to a power source and configured to relay current flow i.e. pressure measurement signals from the resistive elements 12*b*. Any deformation of the resistive elements 12*b* causes a change in electrical resistance of the resistive elements 12*b*. This in turn causes a change in the magnitude of the current flow through the Wheatstone bridge. The change in the current flow provides a measure of the deformation and hence of a pressure applied to the spray membrane 7.

The pressure sensing device 12 may alternatively to a strain gauge comprise a capacitive pressure sensor or a piezoresistive pressure sensor.

In the example of the spray nozzle chip 1 shown in FIG. 3, the substrate 3 comprises a closed cavity or chamber 17. The cavity 17 is delimited by the spray membrane 7. The cavity 17 is delimited by a reference pressure region of the spray membrane 7. The spray membrane 7 hence forms the wall on one side of the cavity 17. The other walls defining the cavity 17 may be formed by the substrate 3. The cavity 17 may be a vacuum cavity. The cavity 17 may hence contain a vacuum. The cavity 17 could alternatively be a pressurised chamber, i.e. a chamber which is not vacuum.

The exemplified spray nozzle chip 1 comprises a reference pressure sensing device 19, also depicted in FIG. 1. The reference pressure sensing device 19 is provided on the spray membrane 7. The reference pressure sensing device 19 is provided on the reference pressure region of the spray membrane 7. The reference pressure sensing device 19 is configured to measure deformation of the reference pressure region of the spray membrane 7.

According to the example shown in FIGS. 1 and 3, the reference pressure sensing device 19 is a strain gauge. The reference pressure sensing device 19 comprises a Wheatstone bridge. The reference pressure sensing device 19 comprises reference resistive elements 19*b* which form the Wheatstone bridge. The reference resistive elements 19*b* are provided on the reference pressure region of the spray membrane 7. The reference pressure sensing device 19 may comprise reference contact pads 19*c* in electrical contact with the reference resistive elements 19*b*. The reference contact pads 19*c* may be configured to be electrically connected to a power source and configured to relay current flow i.e. pressure measurement signals from the reference resistive elements 19*b*. Any deformation of the reference resistive elements 19*b* causes a change in electrical resistance of the reference resistive elements 19*b*. This in turn causes a change in the magnitude of the current flow through the Wheatstone bridge. The change in the current flow provides a measure of the deformation of the spray membrane 7 in the reference pressure region. The reference pressure sensing device 19 can be used for monitoring inhalation when the spray nozzle chip 1 is mounted in an inhaler. When the user inhales over the spray nozzle chip 1 the reference pressure region will be subjected to a suction force, deflecting or causing a deformation of the reference pressure region. The reference pressure sensing device 19 will thereby provide a measure of the user's inhalation technique.

The reference pressure sensing device 19 may alternatively to a strain gauge comprise a capacitive pressure sensor or piezoresistive pressure sensor.

Figure 4:
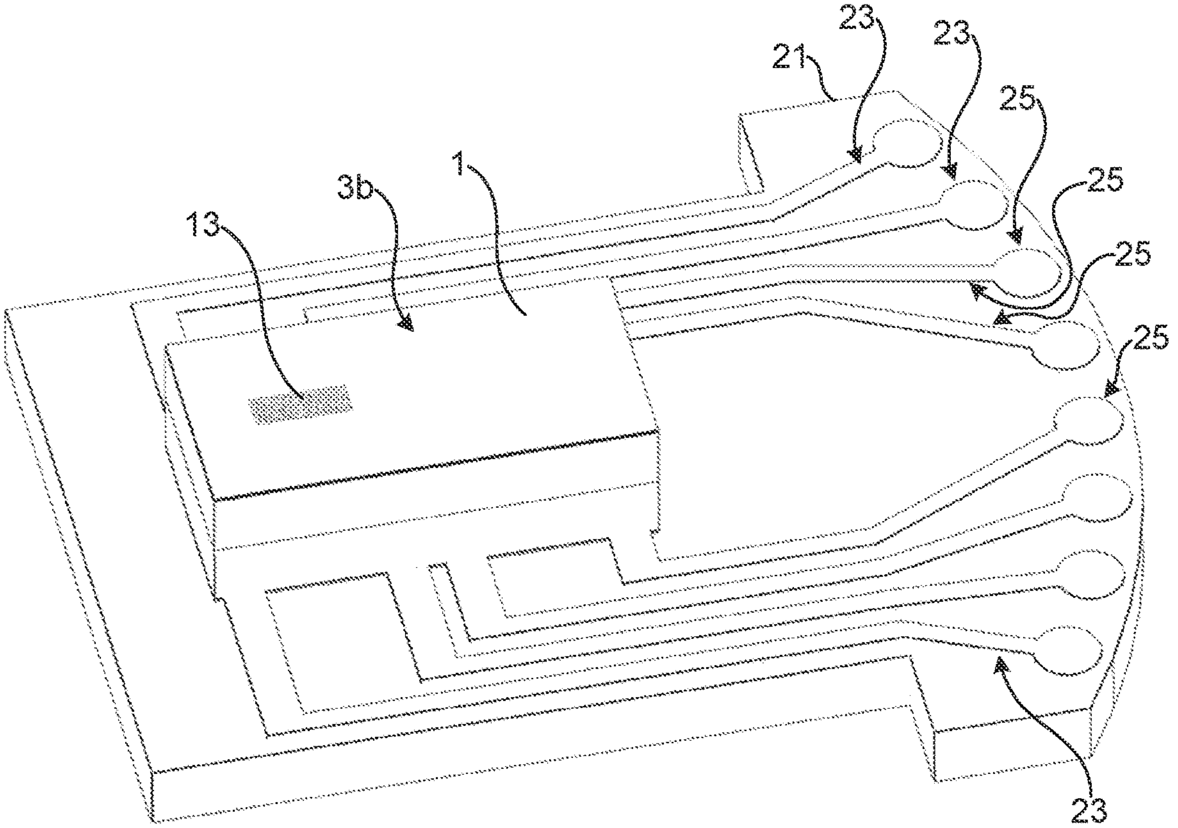
FIG. 4 is a perspective view of the spray nozzle chip mounted to a contact interface.

FIG. 4 shows the spray nozzle chip 1 mounted to a contact interface 21. The spray nozzle chip 1 and the contact interface 21 form part of a spray nozzle device 29 shown in FIG. 8. The contact interface 21 is a substrate. The contact interface 21 may for example comprise ceramic. The contact interface 21 comprises first conductive paths 23 configured to electrically connected to the pressure sensing device 12. The first conductive paths 23 may be connected to the contact pads 12*b*. The first conductive paths 23 may be configured to carry current to the pressure sensing device 12 and to transport current or pressure measurement signals from the pressure sensing device 12.

The contact pads 12*b* may for example be connected to the first conductive paths 23 by soldering or conductive glue.

The contact interface 21 comprises second conductive paths 25 configured to be electrically connected to the reference pressure sensing device 19. The second conductive paths 25 may be connected to the reference contact pads 19*b*. The second conductive paths 25 may be configured to carry current to the reference pressure sensing device 19 and to transport current or pressure measurement signals from the reference pressure sensing device 19.

The reference contact pads 19*b* may for example be connected to the second conductive paths 25 by soldering or conductive glue.

Figure 5:
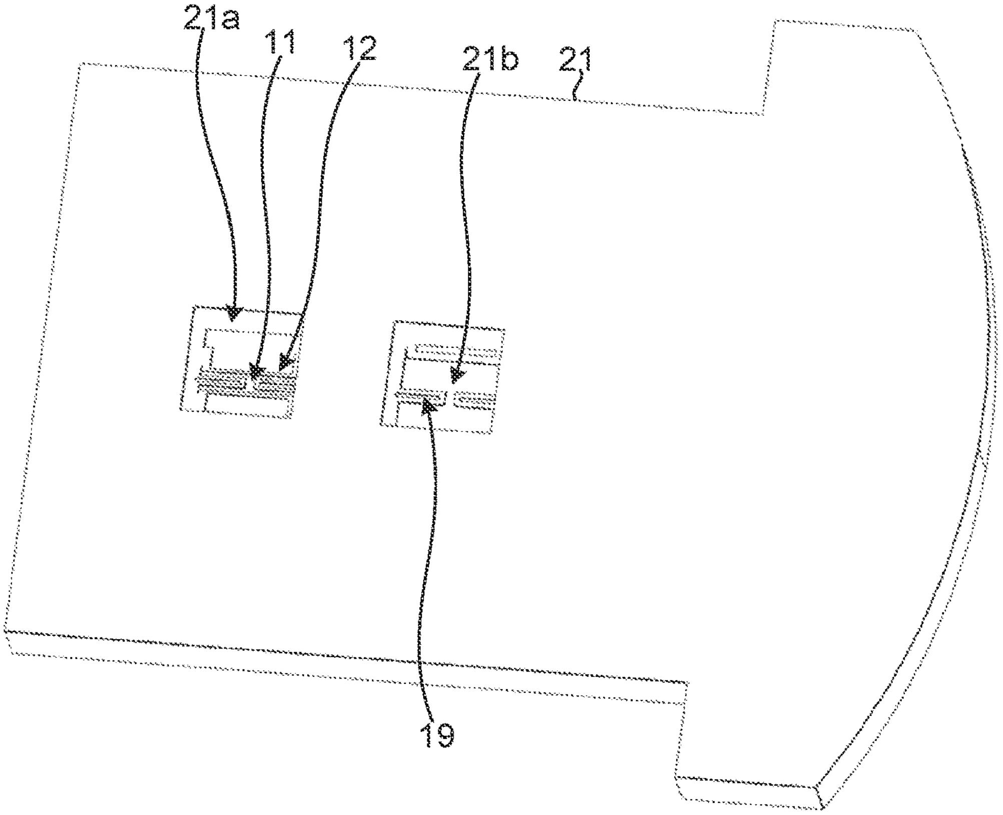
FIG. 5 is a perspective view of the spray nozzle chip mounted to the contact interface from another perspective.

FIG. 5 depicts the opposite side of the contact interface 21 relative to the side shown in FIG. 4. In the present example, the spray membrane 7 faces the contact interface 21. The contact interface 21 is provided with a first through-opening 21*a*. The first through-opening 21 is aligned with the spray orifice region of the spray membrane 7. The spray orifices 11 are arranged within the first through-opening 21. The spray orifices 11 are accessible via the first through-opening 21 of the contact interface 21.

The contact interface 21 is provided with a second through-opening 21*b*. The second through-opening 21*b* is aligned with the reference pressure region of the spray membrane 7. The reference pressure region is hence accessible via the second through-opening 21*b*. Part of the reference pressure sensing device 19 is arranged within the second through-opening 21*b*.

Figure 6:
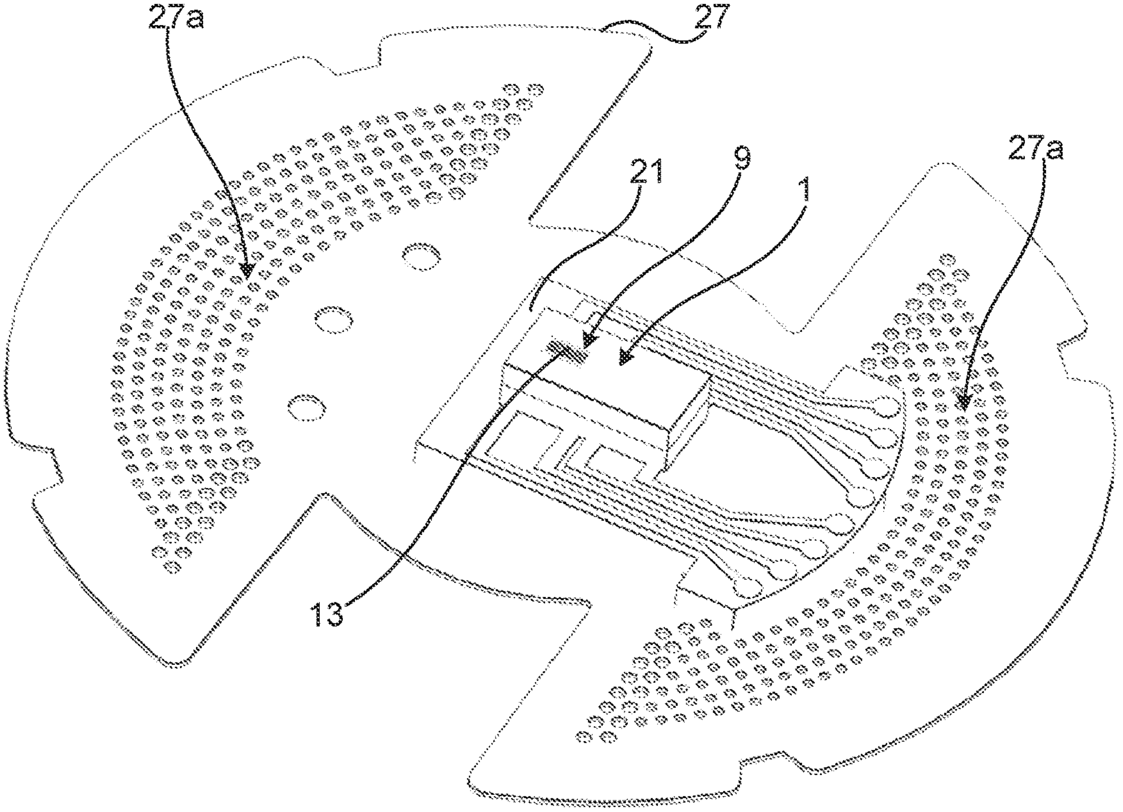
FIG. 6 depicts the spray nozzle chip and contact interface mounted to a carrier.

FIG. 6 shows a bottom side of a contact interface carrier 27. The contact interface 21 is mounted onto the contact interface carrier 27. The contact interface 21 and the contact interface carrier 27 may alternatively be integrated as one part. The contact interface carrier 21 forms part of the spray nozzle device 29. The contact interface carrier 27 comprises a plurality of through-openings 27*a* distributed around the contact interface 21. The through-openings 27*a* may provide protective airflow for the spray nozzle device.

Figure 7:
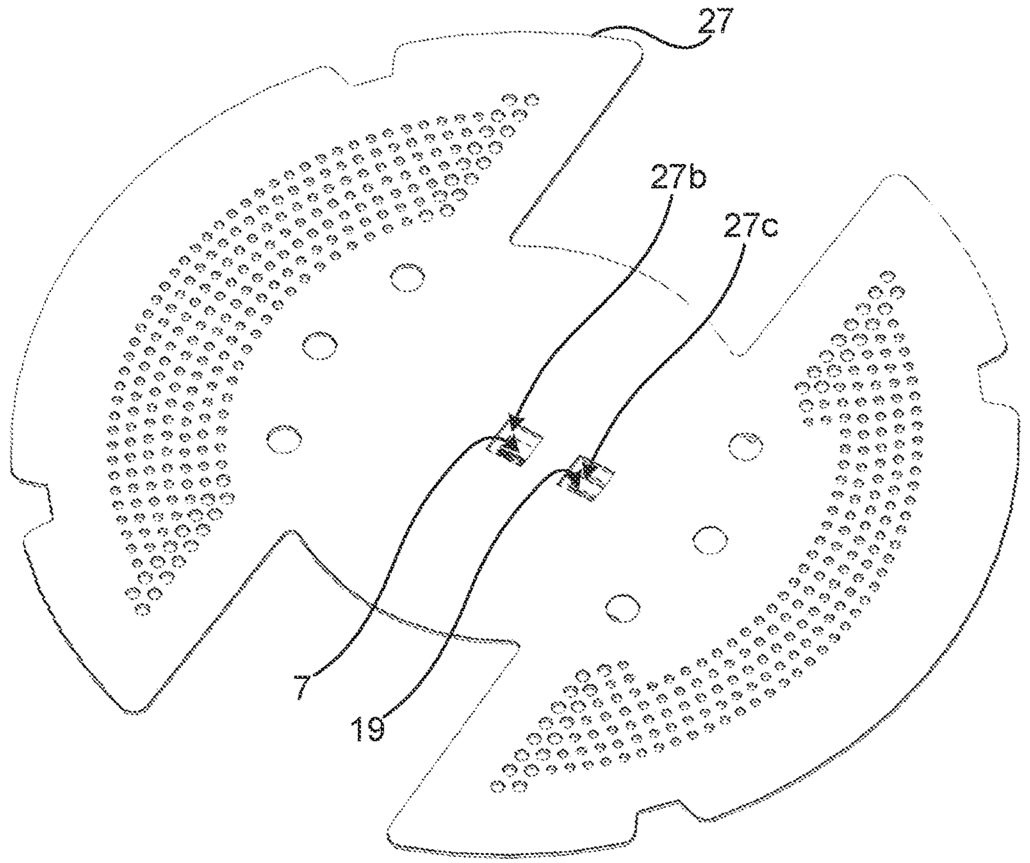
FIG. 7 shows the carrier in FIG. 6 from another perspective.

FIG. 7 shows a top side of the contact interface carrier 27. The contact interface carrier 27 has a carrier first through-opening 27*b*. The carrier first through-opening 27*b* is centred on the contact interface carrier 27. A central axis of the contact interface carrier 27 hence extends through the carrier first through-opening 27*b*. The carrier first through-opening 27*b* is aligned with the spray orifice region of the spray membrane 7 and the first through-opening 21*a*. The carrier first through-opening 27*b* hence leads to the spray orifice region of the spray membrane 7. The spray orifices 11 are hence accessible through the carrier first through-opening 27*b* and the first through-opening 21*a*.

The contact interface carrier 27 has a carrier second through-opening 27*c*. The carrier second through-opening 27*c* is aligned with the reference pressure region of the spray membrane 7 and the second through-opening 21*b*. The carrier second through-opening 27*c* hence leads to the reference pressure region. The reference pressure sensing device 19 is hence accessible via the carrier second through-opening 27*c*.

Fluid flow through the spray orifices 11 is hence enabled. Moreover, the reference pressure sensing device 19 is able to detect deformation of the reference pressure region due to deformation of the reference pressure region caused by suction force generated by user inhalation.

Figure 8:
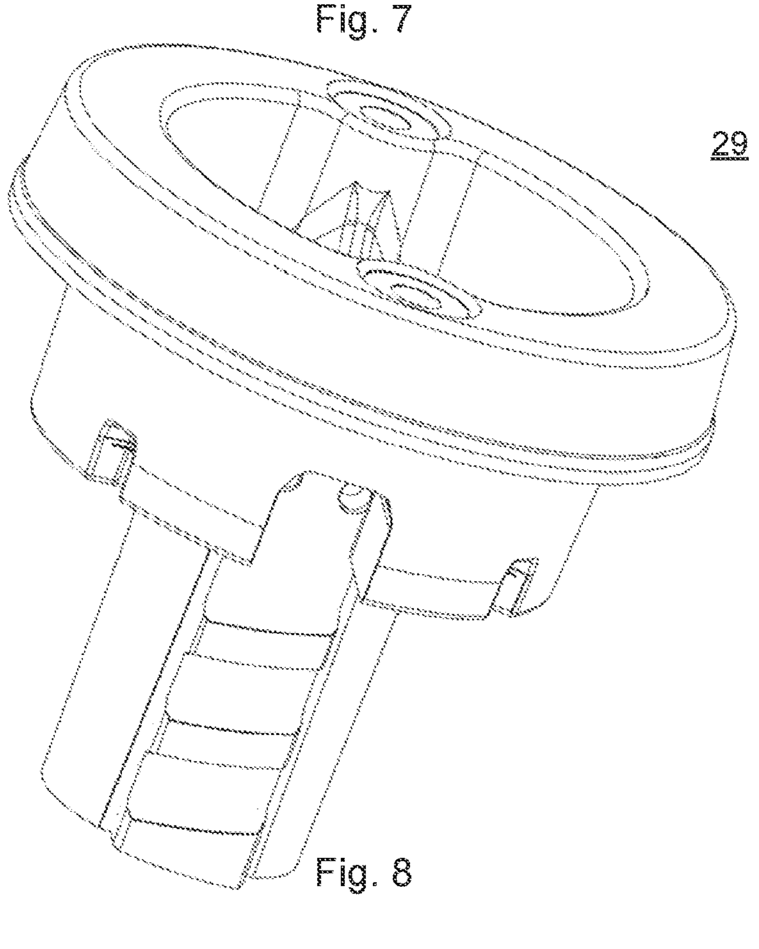
FIG. 8 shows a perspective view of a spray nozzle device.
Figure 9:
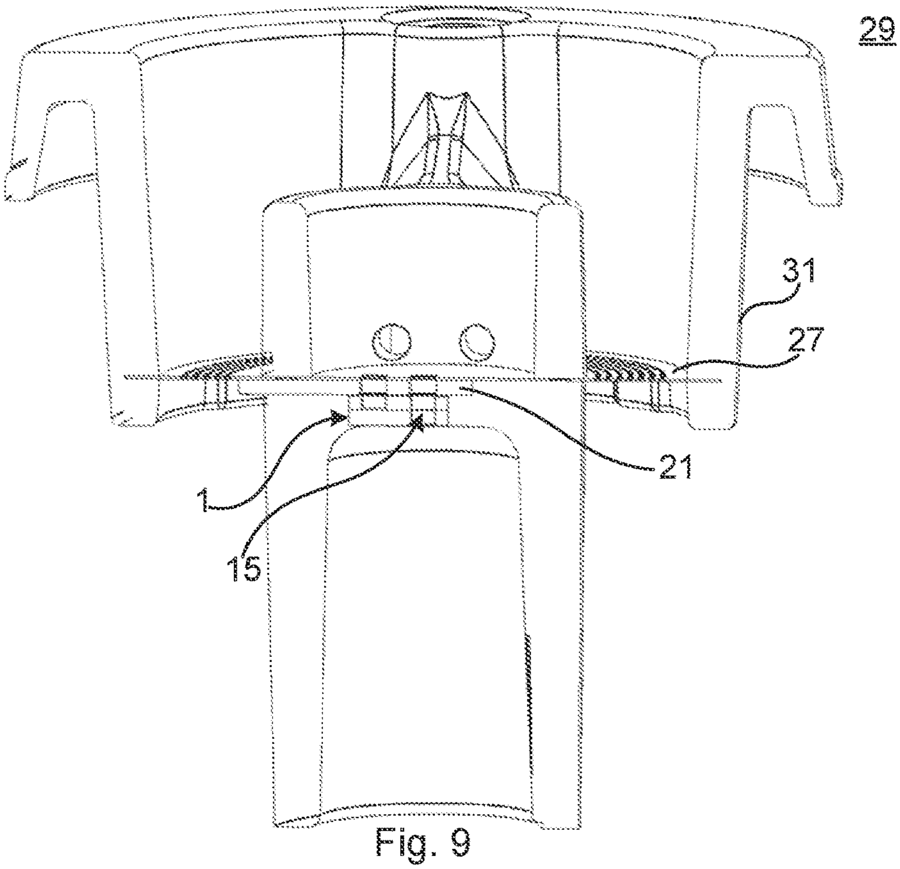
FIG. 9 is a cross sectional view of the spray nozzle device in FIG. 8.
Figure 10:
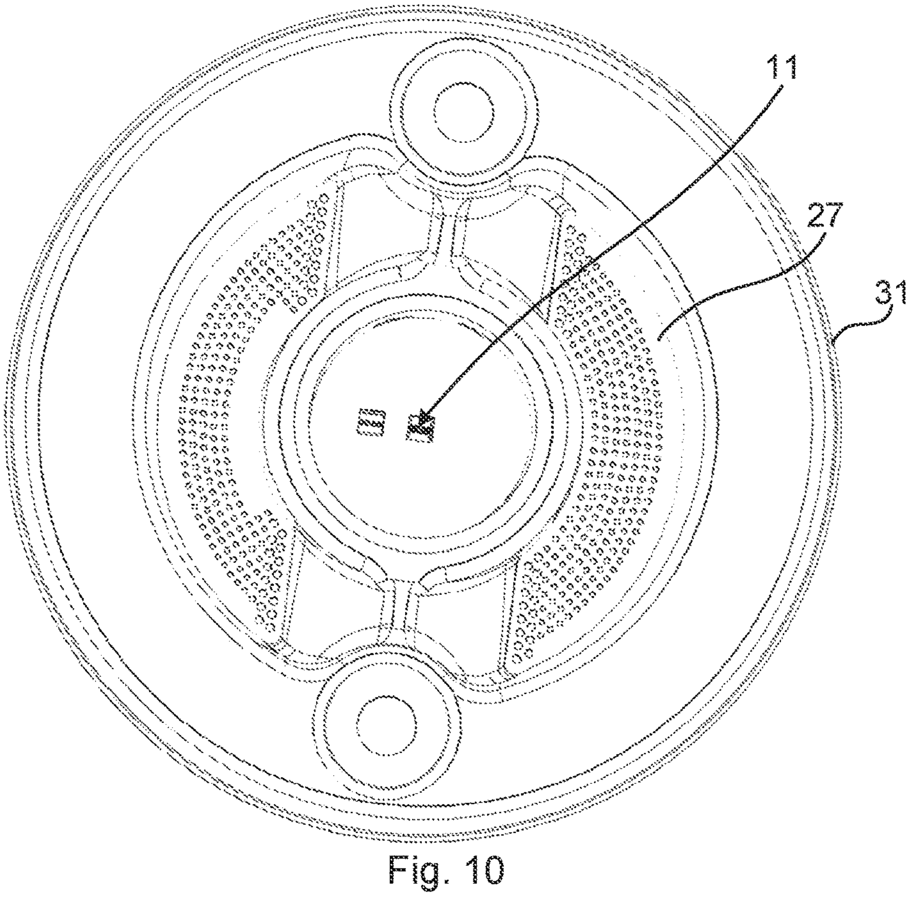
FIG. 10 is a top view of the spray nozzle device in FIG. 8.

FIG. 8 shows a perspective view of a spray nozzle device 29. The spray nozzle device 29 is configured to be installed in an aerosol dispenser. The spray nozzle device 29 comprises a holding member 31 and the spray nozzle chip 1. FIG. 9 is a cross-section of the spray nozzle device 29. The holding member 31 is configured to hold the contact interface carrier 27. The contact interface carrier 27 is centred such that the central axis of the contact interface carrier 27 coincides with the central longitudinal axis of the spray nozzle device 29. The fluid channel 15 is hence centred in the spray nozzle device 29. The central longitudinal axis of the spray nozzle device 29 thus extends through the fluid channel 15, as shown in FIG. 10.

The spray nozzle chip 1 and/or the contact interface carrier 27 may be moulded into the main body of the spray nozzle device 29.

Figure 11:
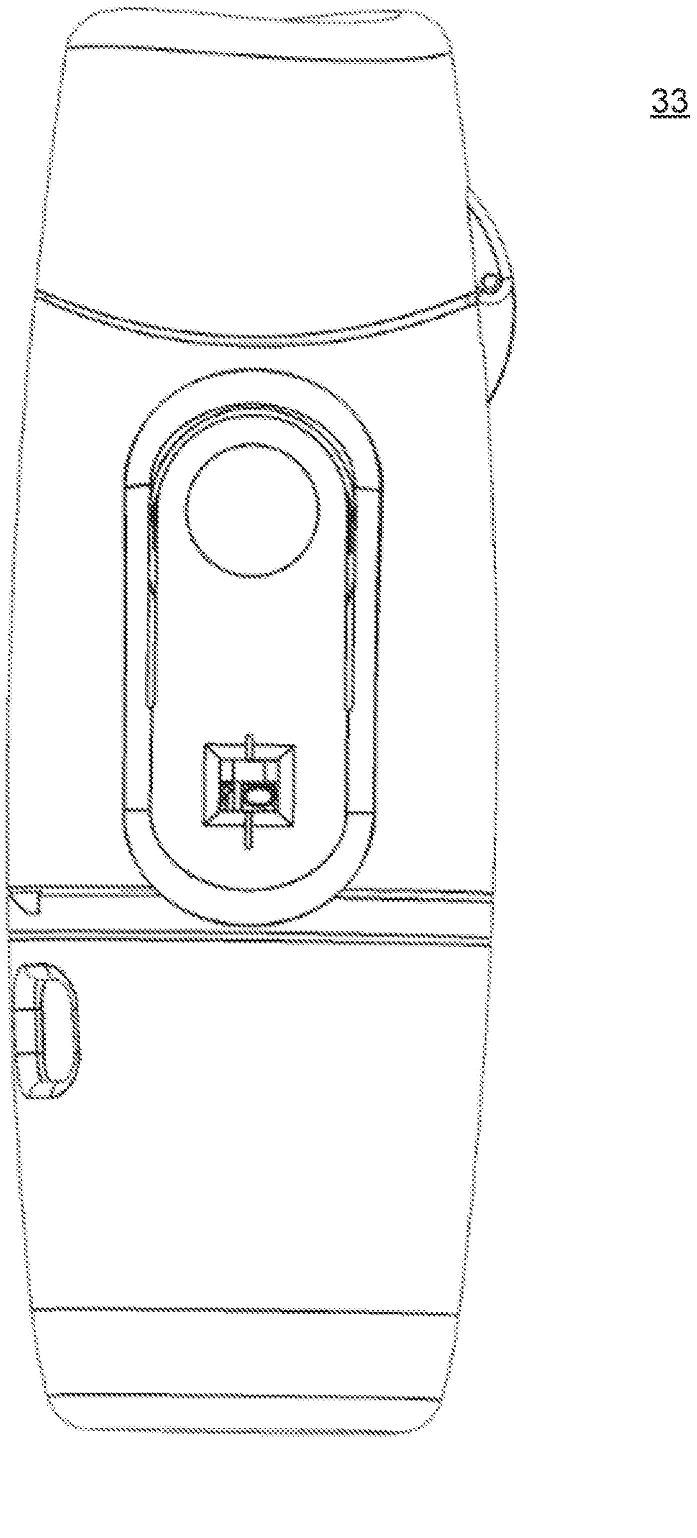
FIG. 11 shows a side view of an aerosol dispenser comprising the spray nozzle device in FIG. 8.

FIG. 11 shows an example of an aerosol dispenser 33, such as an inhaler. The aerosol dispenser 33 may be a medicament delivery device. The aerosol dispenser 33 comprises the spray nozzle device 29. When an aerosol is to be dispensed by the aerosol dispenser 33, the aerosol is created by the spray nozzle chip 1.

The aerosol dispenser 33 may comprise an electronics unit configured to power the pressure sensing device 12. The electronics unit may be configured to power the pressure sensing device 12 and to receive pressure measurement signals via the contact pads 12*c*. The electronics unit may be configured to power the reference pressure sensing device 19 and to receive pressure measurement signals via the reference contact pads 19*c*.

The electronics unit may be configured to process the pressure measurement signals from the pressure sensing device 12. For example, the electronics unit may be configured to determine the pressure applied to the spray membrane 7 in the spray orifice region based on the pressure measurement signals. The electronics unit may be configured to process the pressure measurement signals from the reference pressure sensing device 19. For example, the electronics unit may be configured to determine the suction force or pressure applied to the spray membrane 7 in the reference pressure region.

The electronics unit may according to one variation be configured to transmit the pressure measurement signals from the pressure sensing device 12 and/or the reference pressure sensing device 19 wirelessly to an external unit, such as a smart phone, a tablet computer or to a server in a cloud.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A spray nozzle chip comprising:

a substrate having a spray side and a sieve side, a spray membrane provided on the spray side, a sieve membrane provided on the sieve side, wherein the spray membrane is provided with spray orifices and the sieve membrane is provided with sieve orifices, wherein the substrate has a fluid channel which connects the spray orifices with the sieve orifices, a pressure sensing device configured to measure deformation of the spray membrane to obtain a measure of pressure on the spray membrane, and wherein the substrate has a closed cavity which is delimited by a reference pressure region of the spray membrane.

2. The spray nozzle chip as claimed in claim 1, wherein the spray orifices are provided in a spray orifice region of the spray membrane, and wherein the pressure sensing device is configured to detect deformation of the spray orifice region.

3. The spray nozzle chip as claimed in claim 1, wherein the pressure sensing device comprises one of a strain gauge sensor, a capacitive pressure sensor and a piezoresistive pressure sensor.

4. The spray nozzle chip as claimed in claim 1, wherein the pressure sensing device is a microelectromechanical system, MEMS pressure sensor.

5. The spray nozzle chip as claimed in claim 1, wherein the pressure sensing device is arranged on the spray membrane.

6. The spray nozzle chip as claimed in claim 1, comprising a reference pressure sensing device, wherein the reference pressure sensing device is configured to measure deformation of the reference pressure region.

7. The spray nozzle chip as claimed in claim 6, wherein the cavity is a vacuum cavity.

8. The spray nozzle chip as claimed in claim 6, wherein the reference pressure sensing device comprises one of a strain gauge sensor, a capacitive pressure sensor and a piezoresistive pressure sensor.

9. The spray nozzle chip as claimed in claim 6, wherein the reference pressure sensing device is a MEMS pressure sensor.

10. The spray nozzle chip as claimed in claim 6, wherein the reference pressure sensing device is arranged on the spray membrane.

11. A spray nozzle device comprising:

the spray nozzle chip as claimed in claim 1, and a contact interface configured to be electrically connected to the pressure sensing device to supply power to and obtain pressure measurement signals from the pressure sensing device.

12. The spray nozzle device as claimed in claim 11, comprising the spray nozzle chip, wherein the contact interface is configured to be electrically connected to a reference pressure sensing device to supply power to and obtain pressure measurement signals from the reference pressure sensing device.

13. An aerosol dispenser comprising the spray nozzle device as claimed in claim 11.

14. The aerosol dispenser as claimed in claim 13, wherein the aerosol dispenser is a medicament delivery device.

15. The aerosol dispenser as claimed in claim 14, wherein the medicament delivery device is an inhaler or eye dispenser.

16. A spray nozzle chip comprising:

a substrate having a spray side and a sieve side;

a sieve membrane comprising a sieve orifice that is provided on the sieve side; and a spray membrane provided on the spray side, where the spray membrane comprises, a spray orifice;

a pressure sensing device that measures deformation of the spray membrane to obtain a measure of pressure on the spray membrane; and a reference pressure sensing device that measures deformation of a reference pressure region associated with reference pressure sensing device, wherein the substrate has a fluid channel which connects the spray orifice with the sieve orifice, and wherein the substrate comprises a closed cavity operatively associated with the reference pressure region.

17. The spray nozzle chip as claimed in claim 16, wherein the closed cavity is a vacuum cavity.

18. The spray nozzle chip as claimed in claim 16, wherein the pressure sensing device and the reference pressure sensing device each comprise one of a strain gauge sensor, a capacitive pressure sensor, a piezoresistive pressure sensor, and a MEMS pressure sensor.

* * * * *